(12) United States Patent
Mayerle et al.

(10) Patent No.: US 9,953,294 B2
(45) Date of Patent: Apr. 24, 2018

(54) ENABLING AN IN-MEMORY TRANSACTIONAL APPLICATION

(71) Applicant: SAP AG, Walldorf (DE)

(72) Inventors: Jochen Mayerle, Flein (DE); Clemens Jacob, Mannheim (DE)

(73) Assignee: SAP SE, Walldorf (DE)

( * ) Notice: Subject to any disclaimer, the term of this patent is extended or adjusted under 35 U.S.C. 154(b) by 792 days.

(21) Appl. No.: 13/651,927

(22) Filed: Oct. 15, 2012

(65) Prior Publication Data
US 2014/0108234 A1   Apr. 17, 2014

(51) Int. Cl.
G06Q 40/00   (2012.01)
G06Q 10/10   (2012.01)

(52) U.S. Cl.
CPC .................. G06Q 10/10 (2013.01)

(58) Field of Classification Search
USPC ........................................................... 705/39
See application file for complete search history.

(56) References Cited

U.S. PATENT DOCUMENTS

| | | | |
|---|---|---|---|
| 6,957,186 B1* | 10/2005 | Guheen et al. | 705/323 |
| 7,200,720 B1* | 4/2007 | Yang et al. | 711/141 |
| 7,962,385 B2* | 6/2011 | Falk et al. | 705/35 |
| 8,001,546 B2* | 8/2011 | Felt et al. | 718/101 |
| 8,121,874 B1* | 2/2012 | Guheen et al. | 705/7.11 |
| 2002/0186254 A1* | 12/2002 | Monbaron | 345/810 |
| 2003/0061132 A1* | 3/2003 | Yu et al. | 705/30 |
| 2007/0143254 A1* | 6/2007 | Yang et al. | 707/2 |
| 2009/0158246 A1* | 6/2009 | Sifter et al. | 717/105 |
| 2011/0040738 A1* | 2/2011 | Magruder et al. | 707/704 |
| 2013/0018860 A1* | 1/2013 | Magruder et al. | 707/703 |

* cited by examiner

*Primary Examiner* — Lindsay M Maguire
(74) *Attorney, Agent, or Firm* — Brake Hughes Bellermann LLP (57) ABSTRACT

The embodiments provide a system for linking an application with an in-memory database system for enabling an in-memory-enabled transactional application. The system includes an in-memory transactional processor configured to receive contextual data related to an instantiation of a first business transaction of the application and instantiate at least one second business transaction of the application during a course of processing the first business transaction. The in-memory transactional processor is configured to store results of at least one process step of the at least one second business transaction during the course of processing the first business transaction in an in-memory database, evaluate, at a decision point within the first business transaction, a plurality of alternative process steps, during runtime, and determine a subsequent process step from the plurality of alternative process steps based on the contextual data and captured information stored in the in-memory database.

20 Claims, 8 Drawing Sheets

ENABLING AN IN-MEMORY TRANSACTIONAL APPLICATION

BACKGROUND

Transactional processing may include information processing that is divided into individual, indivisible operations called transactions. Each transaction must succeed or fail as a complete unit. Typically, within a transaction, data is read, processed in a defined process, and then the results of the transaction are stored in a database. Since the results of one transactional process must be stored in a database before the process of another transactional process may use the stored results within its process, conventional applications are limited to a minimum set of data and processing steps because otherwise the processing time is stretched in an unacceptable way for transaction processing patterns having multiple dimensions (e.g., a number of different concurrent, parallel operations).

For example, a conventional transactional application may relate to a sales order application that performs a check on an ability to fulfill a new sales order. In this example, a manufacturing company may receive a large sales request, and the application may process the sales request as follows. In a first step, the sales representative may create a new sales order in the system, and the application may perform an available-to-promise (ATP) check. Based on the performance of the ATP check, the application may determine that only 5% of the requested product is on stock, while 95% of the requested product needs to be manufactured for this sales order. Because there is no urgency from the customer, the sales representative may communicate the delayed availability and transmit a confirmation message indicating that the manufacturing company can handle the sales order. Then, on a reactive basis, in a second step, the production department may recognize the large sale order, perform a materials requirement planning (MRP) process, and derive the resulting demand for procurement materials from the bill of materials. In a third step, the procurement department may create a number of different purchase orders to procure the required production materials on time. However, in a fourth step, the liquidity management in the financial department may receive an exception in their reporting based on the number of purchase orders. For example, due to the time lag between cash disbursement to the suppliers and incoming payment from the customers, the company may face the risk of illiquidity. As such, the company may have to find alternative sources of liquidity or cancel (or delay) the large sales order. As a result, the overall process may be time consuming and/or costly that may end with a negative reputation for the manufacturing company. This type of conventional transactional processing may have sub-optimal execution speed on a reactive basis, which may be ineffective in today's fast-paced business environment.

SUMMARY

The embodiments provide a system for linking an application with an in-memory database system for enabling an in-memory-enabled transactional application to perform a plurality of business transactions in conjunction with the in-memory database system. The system includes an in-memory transactional processor configured to receive contextual data related to an instantiation of a first business transaction of the application and instantiate at least one second business transaction of the application during a course of processing the first business transaction, where the first business transaction and the at least one second business transaction includes one or more process steps. The in-memory transactional processor is configured to store results of at least one process step of the at least one second business transaction during the course of processing the first business transaction in an in-memory database, evaluate, at a decision point within the first business transaction, a plurality of alternative process steps, during runtime, and determine a subsequent process step from the plurality of alternative process steps based on the contextual data and captured information stored in the in-memory database. The captured information includes the results of the at least one process step of the at least one second business transaction. The in-memory transactional processor is configured to store transactional results of the one or more process steps of the first business transaction in the in-memory database to be available for at least one other parallel transaction.

The first business transaction and the at least one second business transaction may be parallel transactions during at least an instance of time. The in-memory transactional processor may be configured to evaluate, at multiple different decision points, alternative process steps and determine a subsequent process step at each decision point.

If the first business transaction stops before completion, the in-memory transactional processor may be configured to return a process of the first business transaction to one of a plurality of process steps including a process step located in a middle of the process of the first business transaction.

The in-memory transactional processor configured to receive contextual data related to an instantiation of a first business transaction of the application may include receiving the contextual data via a user interface, writing the contextual data in the in-memory database system, and then reading the contextual data from the in-memory database. The plurality of process steps may include a standard business process step, the standard business process step with an alternative data set, and an alternative business process step. The in-memory transactional processor may be further configured to determine a data set among a plurality of data sets, at the decision point, to be used within the subsequent process step. The in-memory transactional processor may be configured to execute the determined subsequent process step using the determined data set.

The in-memory transactional processor may be configured to evaluate a plurality of secondary process steps and data sets, and determine a secondary subsequent process step and data set based on results of the subsequent process step and the transactional results of at least one of the first business transaction and the at least one second business transaction. The captured information may include one of social network information, sensor data, and information from at least one mobile device.

The in-memory transactional processor configured to evaluate, at a decision point within the first business transaction, a plurality of alternative process steps, during runtime, may include performing enterprise resource planning (ERP) analytics using the contextual data and the captured information.

Embodiments provide a method for linking an application with an in-memory database system for enabling an in-memory-enabled transactional application to perform a plurality of business transactions in conjunction with the in-memory database system, the method being performed by at least one processor. The method includes receiving contextual data related to an instantiation of a first business transaction of the application, instantiating at least one second business transaction of the application during a course of processing the first business transaction, where the first business transaction and the at least one second business transactions includes one or more process steps. The method further includes storing results of at least one process step of the at least one second business transaction during the course of processing the first business transaction in an in-memory database, evaluating, at a decision point within the first business transaction, a plurality of alternative process steps, during runtime, determining a subsequent process step from the plurality of alternative process steps based on the contextual data and captured information stored in the in-memory database. The captured information includes the results of the at least one process step of the at least one second business transaction. The method further includes storing transactional results of the one or more process steps of the first business transaction in the in-memory database to be available for at least one other parallel transaction.

The first business transaction and the at least one second business transaction may be parallel transactions during at least an instance of time. The evaluating and determining may include evaluating, at multiple different decision points, alternative process steps, and determining a subsequent process step at each decision point.

The method may further include if the first business transaction stops before completion, returning a process of the first business transaction to one of a plurality of process steps including a process step located in a middle of the process of the first business transaction. The plurality of process steps may include a standard business process step, the standard business process step with an alternative data set, and an alternative business process step. The determining may include determining a data set among a plurality of data sets, at the decision point, to be used within the subsequent process step.

Embodiments provide a computer program product tangibly embodied on a non-transitory computer-readable storage medium and including executable code that, when executed, is configured to cause one or more processors to receive contextual data related to an instantiation of a first business transaction of the application, instantiate at least one second business transaction of the application during a course of processing the first business transaction, where the first business transaction and the at least one second business transactions includes one or more process steps, store results of at least one process step of the at least one second business transaction during the course of processing the first business transaction in an in-memory database, evaluate, at a decision point within the first business transaction, a plurality of alternative process steps, during runtime, determine a subsequent process step from the plurality of alternative process steps based on the contextual data and captured information stored in the in-memory database, where the captured information includes the results of the at least one process step of the at least one second business transaction, and store transactional results of the one or more process steps of the first business transaction in the in-memory database to be available for at least one other parallel transaction.

The first business transaction and the at least one second business transaction may be parallel transactions during at least an instance of time. The executable code that, when executed, may be configured to cause the one or more processors to evaluate, at multiple different decision points, alternative process steps and determine a subsequent process step at each decision point.

The details of one or more implementations are set forth in the accompanying drawings and the description below. Other features will be apparent from the description and drawings, and from the claims.

DETAILED DESCRIPTION

The embodiments provide a system for linking an application (e.g., the sales order application) with an in-memory database for enabling an in-memory-enabled transactional application to perform a plurality of business transactions in conjunction with the in-memory database system. With respect to the above example, within the context of creating a new sales order, the in-memory-enabled sales order application may perform steps 2, 3 and 4 on the fly and recommend consulting with the finance department before sending out a confirmation to the customer. For example, the in-memory-enabled sales order application may perform the MRP process, create the necessary purchases orders, and perform the liquidity check during runtime of the application in real-time or near real-time before a confirmation is communicated to the customer.

Generally, by linking an application (which may be virtually any type of application) with the in-memory database system, the business process layer is essentially linked with in-memory technology, thereby having the results of analytic processing as well as related processes/transactions for use within the transactional context, which may permit flexibility and speed not seen with conventional applications. For example, the in-memory-enabled transactional application may include the capabilities of performing analytics at the same time (or around the same time) of execution of its business process model. The analytical results may be stored in the in-memory database, and available for other process steps/transactions. Further, the captured results may be used to determine a subsequent process step within the context of the business process model. For example, based on the captured results (which may include the analytical results and the transactional results of the business process), the system may decide to follow a standard business process or branch to an alternative business process. In other words, while the in-memory-enabled transactional application is running, the in-memory-enabled transactional application may evaluate alternative business process variations and perform analytical processing in the transactional context of the current transaction in such a way that the current transaction is not unreasonable delayed.

Stated another way, a decision may be based on the captured results, and the decision may involve a determination about subsequent process steps within the transactional context and the business process model. Then, the results of the subsequent process steps may be persisted in the in-memory database, and are available relatively immediately for any analysis used within the transactional context for further steps in the business process model associated with other processes/transactions. These techniques may allow for decisions based on the same business data, which may lead to semantic business decisions because the decisions are based on business data having the same state. For example, at each decision, the results of the decision are stored in the in-memory database system such that similar decisions lead to similar results.

In another example, the in-memory-enabled transactional application may relate to a loan inquiry application. In this example, a customer may call a bank in order to obtain a bank loan, and during the conversion with the bank representation, the bank representation may enter the relevant data into the system. Within the transactional context of entering data into the system, the in-memory-enabled transactional application may analyze the credit history, customer rating, and/or business relationship, etc. Based on this analysis, loan conditions with a range of interest rates may be proposed and the bank representative may start the negotiation with the customer. In other words, upon instantiation of a loan inquiry transaction, the in-memory-enabled transactional application may prompt a secondary transaction related to the collection of the credit history, customer rating, and/or business relationship, and store this information in the in-memory database system. Then, the in-memory-enabled transactional application may evaluate alternative process steps and determine a subsequent process based on the newly captured information stored in the in-memory database system, e.g., deciding on a follow up process path based on the existing and newly captured information. Then, further information from the customer may be used to recalculate the conditions and/or interest rates, if necessary.

It is noted that the above examples are merely for explanatory purposes only. The embodiments encompass any type of application that is linked to the in-memory database system, thereby forming an in-memory-enabled transactional application to perform a plurality of business transactions in conjunction with the in-memory database system. These and other features of the embodiments will be discussed below with reference to the figures.

Figure 1:
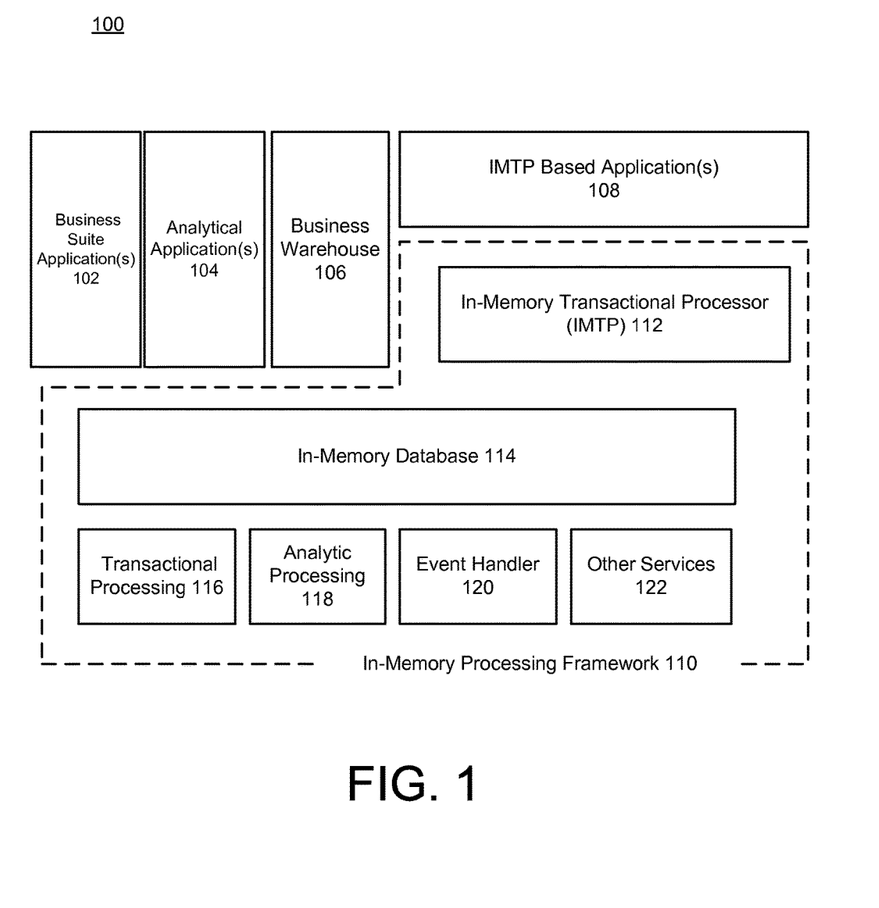
FIG. 1 illustrates a system for linking an application with an in-memory database for enabling an in-memory-enabled transactional application according to an embodiment.

FIG. 1 illustrates a system 100 for linking an application with an in-memory database for enabling an in-memory-enabled transactional application to perform a plurality of business transactions in conjunction with the in-memory database system according to an embodiment. The system 100 may include one or more business suite applications 102, one or more analytical applications 104, a business warehouse 106, one or more in-memory transactional processor (IMTP) based applications 108 (also referred to as in-memory-enabled transactional applications), and an in-memory processing framework 110. The system 100 may include other components that are well known to one of ordinary skill in the art.

The business suite applications 102 may include applications configured to execute and optimize business and IT strategies in the areas of customer relationship management, manufacturing, human resources, financials, product lifecycle management, supplier lifecycle management, supplier relationship management, supply chain management, and/or transportation management, among others, for example. For example, the business suite applications 102 may include a bundle of applications that provide integration of information and processes, collaboration, industry-specific functionality, and scalability.

The analytical applications 104 may include applications configured to analyze business processes including monitoring performance against industry-specific key performance indictors (KPIs). Generally, the analytical applications 104 may include applications that manage business planning, regulatory compliance, and the monitoring of KPIs. For instance, the analytical applications 104 may perform root cause analyses, simulate business processes/alternative business processes, and/or perform predictions based on operational metrics associated with the business performance.

The business warehouse 106 may be a database for storing business data including transactional information in various types of structures (e.g., Data Store Objects, InfoObjects, and/or multidimensional structures). Business data may refer to any type of data associated with a business. For example, business data may include documents relating to sales, manufacturing, accounting, employees, products, or any type of area associated with a business. Further, the business data may include customer data, sales information, and/or any other data information considered as part of the business processes. The business data may be loaded into the business warehouse 106 via an extraction, transformation, and load (ETL) operation. However, the embodiments encompass any type of data extraction mechanism for extracting data from outside sources. Business data may be extracted from one or more outside sources, and because the extracted business data may be associated with a number of different formats (e.g., Word, Excel, PDF, Access, etc.), the formats of the extracted business data are translated into a format suitable for storage in the business warehouse 106.

In one embodiment, the business warehouse 106 operates as in intermediary database, where the captured business data is eventually stored in an in-memory database 114 included in the in-memory processing framework 110. Also, the business data may be collected, and stored directly in the in-memory database 114.

The IMTP-based applications 108 may include any type of application that is linked to the in-memory processing framework 110. The in-memory processing framework 110 may also be referred to as an in-memory database system. According to some examples, the IMTP-based applications 108 may include a purchase order application, sales order application, and/or a loan inquiry application. Operations of the purchase order application is further illustrated with respect to FIGS. 5A and 5B, operations of the sales order application is further illustrated with respect to FIG. 6, and operations of the loan inquiry application is further illustrated with respect to FIG. 7. However, the embodiments encompass any type of IMTP-based application. For instance, as further discussed below, by linking an application with the in-memory processing framework 110, virtually any type of application may become an IMTP-based application 108. Such linking mechanism may be accomplished through the structure and arrangement of the in-memory processing framework 110, as discussed below.

The in-memory processing framework 110 may include an in-memory transactional processor (IMTP) 112, an in-memory database 114, transactional processing 116, analytic processing 118, an event handler 120, and other standard services 122 associated with the in-memory processing framework 110. The in-memory processing framework 110 may be a type of in-memory framework that processes and stores business data and includes the capabilities of performing complex calculations on the stored data. In other words, calculation logic is pushed into the database level, thereby increasing transactional speeds and decreasing the size of the middle layer (e.g., application layer). The sub-components of the in-memory processing framework 110 are discussed below. Also, it is noted that the in-memory processing framework 110 may include other functionalities and/or subcomponents that are well known to one of ordinary skill in the art, or are discussed herein with reference to the embodiments.

The in-memory database 114 may be a type of database system that supports real-time analytics and transactional processing including replication and aggregation techniques. The in-memory database 114 may include a parallel processing data store that utilizes row-based, column-based, and/or object-based storage techniques. In one embodiment, the in-memory database 114 may be HANA Enterprise 1.0 (any other versions) that is developed by SAP. The in-memory database 114 may collect business data according to any type of extraction mechanism including the ETL process. Furthermore, the in-memory database 114 may store business process/transactional results and the results of analytical processing. As such, the in-memory database 114 may include social network information that has been collected from one or more social network applications, sensor data that has been collected from one or more sensors, and/or mobile device information that has been collected from one or more mobile devices. Also, the in-memory database 114 may store big data, which may be data sets having a size beyond an ability to process within a threshold period of time. However, the embodiments encompass any type of in-memory database 114 and/or in-memory processing framework 110.

The IMTP 112 may be positioned on top of the in-memory database 114, and may communicate with the in-memory database 114 in order to carryout the business process model of the IMTP-based applications 108. For example, the IMTP 112 may execute the operations and functionalities associated with the IMTP-based applications 108 according to their respective business process model. The IMTP 112 may leverage the capabilities of the in-memory processing framework 110 to include the results of analytical processing, as well as the process steps of the IMTP-based applications 108 within their transactional context. In one example, if the IMTP-based application 108 includes the loan inquiry application, the loan inquiry process may include steps that receive new loan information (e.g., amount of loan, customer(s), etc.), analyze credit history, customer rating and/or business relationship, and select loan conditions based on such an analysis. In this transactional context, the IMTP 112 may obtain the results of the analysis (which have been persisted in the in-memory database 114), and based on these results, the IMTP 112 may make a decision regarding the type of loan conditions for the customer on the fly. As such, as compared with conventional loan inquiry applications, the time period associated with this type of decision is decreased. Again, the above example is merely an illustration, where the embodiments encompass virtually any type of transactional context. The generic functionalities and operations of the IMTP 112 are further explained with reference to FIGS. 2-4, and non-limiting examples are further explained with reference to FIGS. 5A, 5B, 6, and 7.

The transactional processing 116 may include other in-memory processing that is not performed by the IMTP 112 such as data management services, administration and data modeling, and/or data integration services, as well as any other type of in-memory computing technology. The analytic processing 118 may include in-memory processing capabilities of handling multi-dimensional analytical quires including relational reporting and data mining. The event handler 120 may be configured to handle events thus to enable event-driven programming or event-based programming based on common principles. For example, the event handler 120 may control the business events at the decision point 130. The other services 122 may include standard in-memory services known to one of ordinary skill in the art such as an authority check, backup service and/or recovery service.

Figure 2:
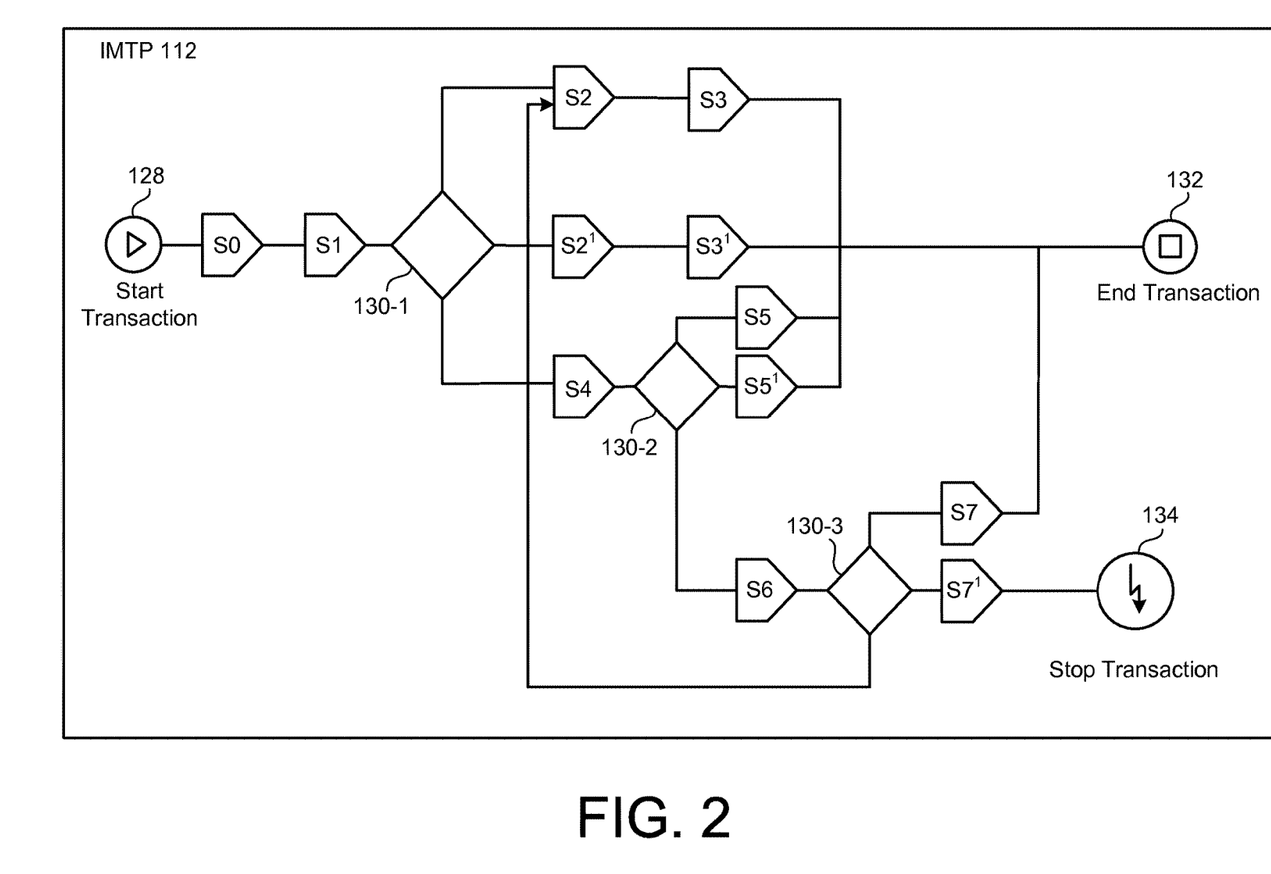
FIG. 2 illustrates a transactional processing view of an in-memory transactional processor of FIG. 1 according to an embodiment.

FIG. 2 illustrates a transactional processing view of the IMTP 112 according to an embodiment. For example, in FIG. 2, the IMTP 112 may execute a plurality of process steps (e.g., S0-S7) for a respective IMTP based application 108. In other words, the IMTP 112 carries out the process steps associated with the respective IMTP based application 108 according to the business process model. Also, according to the embodiments, during the course of carrying out the process steps, the IMTP 112 evaluates and determines a subsequent process step and data set at one or more decision points 130. For example, in the middle of the transactional processing, the IMTP 112 may evaluate and determine alternative process variances including the capabilities of performing analytic processing on captured information in the in-memory database 114. These evaluations and determinations may be performed at multiple points throughout the transactional processing of a particular transaction, e.g., first decision point 130-1 through third decision point 130-3. The outcome of the evaluation may indicate that an alternative business process should be used and/or a display of another user interface associated with the alternative business process. The IMTP 112 operating in conjunction with the in-memory processing framework 110 allows for relatively quick processing speeds within the transactional context such that the transaction may be completed in a reasonable manner. At each decision point 130, the IMTP 112 may utilize the results of another process step(s) and/or transaction for use in the decision whether to follow a standard business process (e.g., S2, S3), a standard business process with an alternative data set (e.g., $S2^1$, $S3^1$), or an alternative business process (e.g., S4). These results have previously been stored in the in-memory database 114 and are available for use during the decision points 130 of FIG. 2.

For example, the IMTP 112 may start a transaction (128) related to the IMTP based application 108. The transaction may relate to any type of transaction having a series of individual operations (e.g., process steps), which must either succeed or fail as a complete unit. As such, transactional processing allows multiple individual operations or process steps to be linked together as a single transaction. FIG. 2 illustrates the operation of a single transaction having a plurality of operations or process steps (e.g., S0-S7). Thus, in accordance with the process model of the IMTP based application 108, the IMTP 112 may execute an initial step S0 and a first step S1. In one example, the IMTP 112 may present the user with in an interactive display (S0), and then receive contextual data via the interactive display and store the contextual data in the in-memory database 114 (S1). However, in the context of FIG. 2, process steps S0 and S1 are merely generic process steps and may relate to essentially any type of process step. Generally, the type of process step depends on the context of the IMTP based application 108. With that said, usually, the initial process steps of a business application are the collection of contextual data from the user itself or from the in-memory database 114.

Then, at a first decision point 130-1, the IMTP 112 may evaluate a plurality of alternative process steps (and possibly data sets), during runtime of the IMTP based application 108, and determine at least one of a subsequent process step and data set (e.g., S2, $S2^1$ or S4) based on the received contextual data and captured information stored in the in-memory database 114. The captured information may relate to results of one or more process steps for a separate parallel transaction (e.g., a second transaction), which may have been prompted by the current transaction. In other words, the IMTP 112 may instantiate a second business transaction of the IMTP-based application 108. Also, the captured information may include the social network information, the sensor data, the mobile device information, and/or any types of big data. In general, the captured information may include the results of any type of analytical processing, as well as the transactional processing of one or more steps of the first and/or second transactions. As such, at the first decision point 130-1, the IMTP 112 may read data and process the context of existing and newly captured data to decide on a follow-up process step and data context.

In particular, at the first decision point 130-1, a first path indicated by process step S2 and process step S3 may represent a standard process of the IMTP based application 108, a second path indicated by process step $S2^1$ and $S3^1$ may represent a standard process with an alternative data set, and a third path indicated by process step S4 may represent an alternative process of the IMTP based application 108. A data set may refer to a set of business data that is used within a respective process step. As such, alternative data sets may be considered different data sets of business data, which may or may not involve at least some overlapping data. Therefore, at the first decision point 130-1, the IMTP 112 may evaluate alternative process steps, as well as alternative data sets, in order to decide on a follow-up process path. According to the embodiments, the IMTP 112 may evaluate each of the first, second and third path, and select one of the paths based on the received contextual data (e.g., from steps S0 and S1) and the captured information in the in-memory database 114. As indicated above, the captured information may relate to the results of analytical processing and one or more process steps of one or more parallel transactions, which have been persisted in the in-memory database 114. Then, the IMTP 112 may store the results of the evaluation and determination in the in-memory database 114 to be available for one or more parallel transactions.

Also, at the first decision point 130-1, if the IMTP 112 selects the second process step S2, the IMTP 112 may execute the second process step S2, and then the third process step S3. In this particular example, after execution of the third process step S3, the transaction is ended (132). The end of the transaction may indicate that no roll back is possible. In other words, the end of the transaction may indicate that the transaction may not revert back to one of the previous process steps (e.g., S3, S2, S1, or S0). At the first decision point 130-1, if the IMTP 112 selects the second process step with the alternative data set (e.g., $S2^1$), the IMTP 112 may execute the second process step with the alternative data set $S2^1$, then execute the third process step with the alternative data set $S3^1$. In this particular example, after the IMTP 112 executes the third process step with the alternative data set $S3^1$, the transaction is ended (132).

However, if the IMTP 112 selects the alternative process step S4, the IMTP 112 may execute the alternative process step S4, and then may reach a second decision point 130-2. At the second decision point 130-2, similar to the first decision point 130-1, the IMTP 112 may evaluate a plurality of alternative process steps and data sets (e.g., S5, $S5^1$ and S6) during runtime of the IMTP based application 108 and determine a subsequent process step and data set (e.g., S5, $S5^1$ or S6) based on the captured information and/or previous process steps for the current transaction and/or process steps of another parallel transaction(s). At the second decision point 130-2, a first path indicated by process step S5 may represent a standard process of the IMTP based application 108, a second path indicated by process step $S5^1$ may represent a standard process with an alternative data set, and a third path indicated by process step S6 may represent an alternative process of the IMTP based application 108. Therefore, at the second decision point 130-2, the IMTP 112 may evaluate alternative process steps, as well as alternative data sets, in order to decide on a follow-up process path. According to the embodiments, the IMTP 112 may evaluate each of the first, second and third path, and select one of the paths.

Depending on the selected process step, the IMTP 112 may execute the standard process step S5, the standard process step with alternative data set $S5^1$ or the alternative process step S6. In this example, the execution of the standard process step S5 or the standard process step with alternative data set $S5^1$ results in the end of the transaction (132). However, after execution of the alternative process S6, the process reaches a third decision point 130-3.

Similar to the first decision point 130-1 and the second decision point 130-2, at the third decision point 130-3, the IMTP 112 may evaluate a plurality of alternative business processes and data sets (e.g., S7, $S7^1$ and S2) and determine at least one of a subsequent process step and data set (e.g., S7, $S7^1$ or S2) based on the captured information in the in-memory database 114. Depending on the evaluation, the IMTP 112 may determine a standard business process (S7), a standard business process with alternative data set ($S7^1$) or an alternative business process step (S2). According to this example, if the standard business process S7 or the standard business step with alternative data set $S7^1$ is selected, the IMTP 112 may execute either the standard business process step S7 or the standard business process step with alternative data set $S7^1$, which may result on the transaction being stopped (134). According to the embodiments, if the business transaction is stopped before completion, the IMTP 112 may be configured to return a process of the transaction to one of the plurality of process steps including a process step located in the middle of the business transaction. For example, the stoppage of the business transaction allows for the roll back of data in a manner that ensures transactional continuity. Depending on the context, the IMTP 112 may return the process to one of the initial process step S0, the first process step, or any of the process steps S2-S7.

Figure 3:
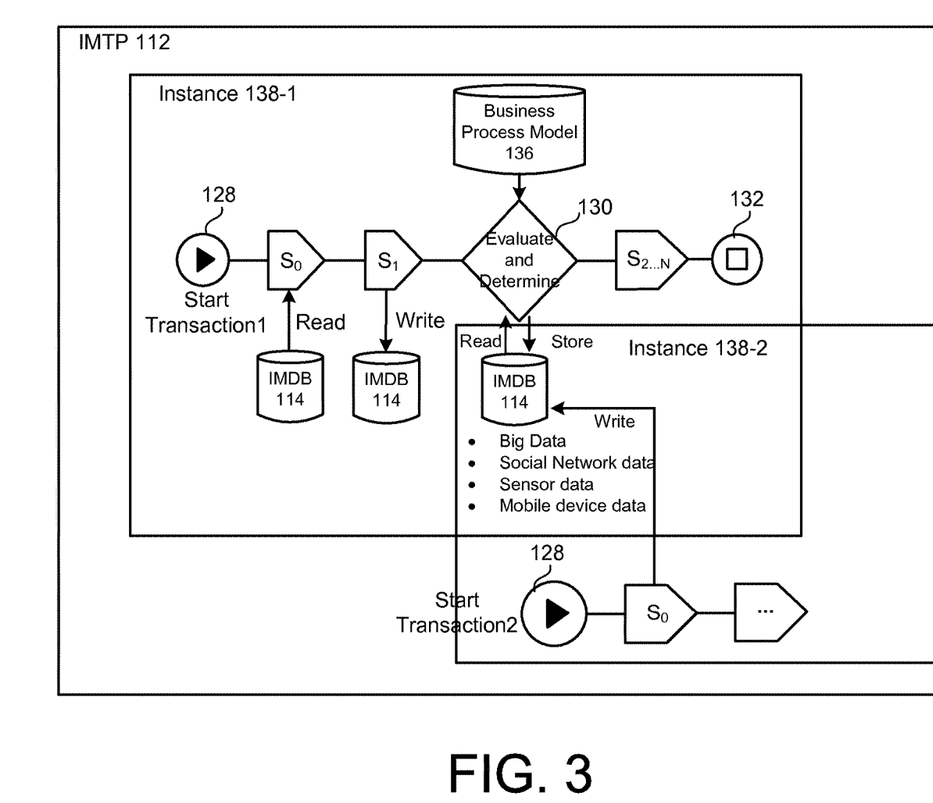
FIG. 3 illustrates a transactional processing view of the in-memory transactional processor of FIG. 1 according to another embodiment.

It is noted that the example of FIG. 3 is merely for explanatory purposes only, where the embodiments encompass any type of arrangement of the process steps and decisions points 130. Again, the arrangement of these components is dependent on the context of the IMTP based application 108, and may widely vary. For instance, the embodiments encompass any number of decision points 130 within a process model of a transaction.

FIG. 3 illustrates a transactional processing view of the IMTP 112 according to another embodiment. For example, FIG. 2 illustrates the transactional processing of a single transaction. However, in reality, the system 100 may involve a number of users in the same business context. Therefore, at some point, the IMTP 112 may handle a plurality of parallel transactions. As such, FIG. 3 illustrates two separate transactions that are parallel during at least a portion of time. Although FIG. 3 illustrates only two transactions, the embodiments encompass any number of parallel transactions.

As discussed in greater detail below, when processing the first transaction, the IMTP 112 does not necessarily lock the in-memory database 114 for use in carrying out its operations. For example, conventional transactional processing may restrict access to a portion of a database for a single transaction until that transaction is completed. Then, another transaction may be granted access to that same portion in order to carryout its operations. According to the embodiments, the IMTP 112 may utilize a consistent access control mechanism when executing the operations of the first transaction so that other parallel transactions including the second transaction can access and persist data into the in-memory database 114 around the same time. The consistent access control mechanism of the embodiments permits parallel transactions to access and store data into the in-memory database 114 in a consistent and reliable manner.

In the example of FIG. 3, the IMTP 112 may generate a first instance 138-1 of the IMTP based application 108, which may be virtually any type of application. As such, in response to the instantiation of the business transaction, the IMTP 112 may start the transaction (128), and then perform the initial process step S0. In this example, the IMTP 112 may read data from the in-memory database 114 and provide the data to the user via an interactive display. Then, in the first step S1, the IMTP 112 may receive contextual data via the interactive display screen, and write the contextual data to the in-memory database 114, which may be immediately available for other processes/transactions. Then, the IMTP 112 may generate a second instance 138-2 of the IMTP based application 108, which may be a parallel transaction with the first transaction of the first instance 138-1 for at least an instance of time. The first transaction and the second transaction may have to share at least a portion of data in order to carry out their operations.

The second instance 138-2 may start a second business transaction after but related to the first business transaction. For example, the second business transaction may be prompted by the first business transaction. After the second business transaction starts (128), the IMTP 112 may execute the initial process step S0, and then write the results of the initial process step S0 to the in-memory database 114 in order to be available for use for the other parallel transactions including the first business transaction.

Referring to the first instance 138-1, at the decision point 130, the IMTP 112 may be configured to evaluate a plurality of alternative process steps and data sets during runtime of the IMTP based application 108 and determine a subsequent process step and/or data set based on the contextual data (e.g., written to memory in the first process step S1 and the captured information of the second business transaction. Then, the IMTP 112 may be configured to store the results of the evaluation and determination in the in-memory database 114. Subsequently, the IMTP 112 may be configured to execute the determined subsequent process step with the determined data set such as the second process step S2 to the $N^{th}$ process step, and the results of the first transaction may be stored in the in-memory database 114 to be made available for one or more other parallel transactions. Although FIG. 3 illustrates only two instances 138, the embodiments encompass any number of instances/transactions generated by the IMTP 112.

Figure 4:
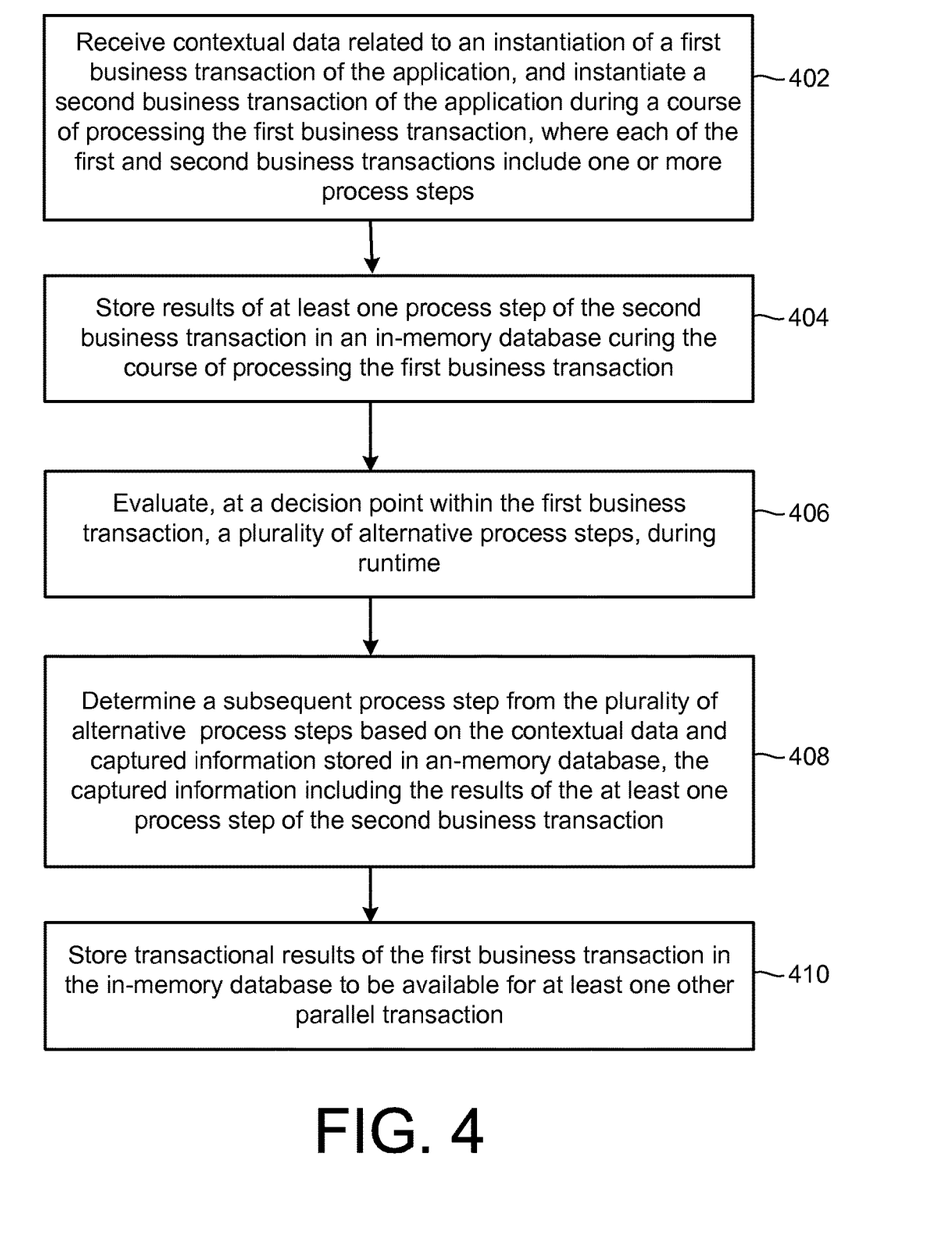
FIG. 4 is a flowchart illustrating example operations of the in-memory transactional processor of FIG. 1 according to an embodiment.

FIG. 4 is a flowchart illustrating example operations of the IMTP 112 of FIG. 1 according to an embodiment. Although FIG. 4 is illustrated as a sequential, ordered listing of operations, it will be appreciated that some or all of the operations may occur in a different order, or in parallel, or iteratively, or may overlap in time.

Contextual data related to an instantiation of a first business transaction of the application may be received, and a second business transaction of the application may be instantiated during a course of processing the first business transaction, where each of the first and second business transactions includes one or more process steps (402). For example, the IMTP 112 may be configured to receive contextual data related to a first instance 138-1 of the IMTP based application 108. In one embodiment, the IMTP 112 may receive the contextual data via a user interface, write the contextual data in the in-memory database 114, and then read the contextual data from the in-memory database 114. Alternatively, the IMTP 112 may receive the contextual data directly from the in-memory database 114. During the course of processing the first business transaction (e.g., the first instance 138-1), the IMTP 112 may instantiate a second business transaction, as shown by the second instance 138-2 in FIG. 3. During at least a portion of time, the first transaction and the second transaction may be parallel transactions. As shown in FIG. 3, each of the first transaction and the second transactions may include one or more process steps.

Results of at least one process step of the second business transaction may be stored in an in-memory database during the course of processing the first business transaction (404). For example, the IMTP 112 may store the results of at least one process step of the second business transaction in the in-memory database 114 during the course of processing the first business transaction. In particular, referring to FIG. 3, during the course of processing the first business transaction (e.g., the first instance 138-1), the IMTP 112 may store the results of one or more of the process steps of the second business transaction (e.g., the second instance 138-2). In the case of FIG. 3, the IMTP 112 may store the results of the process step $S_0$ in the in-memory database 114 to be available for other parallel transactions including the first transactions.

A plurality of alternative process steps may be evaluated, at a decision point within the first business transaction, during runtime (406). For example, the IMTP 112 may be configured to evaluate the plurality of alternative process steps during runtime at a decision point 130 within the first business transaction. In particular, the IMTP 112 may consider a plurality of alternative process steps in the context of the application, where each process step may relate to a different step to be taken by the IMTP 112. Also, the evaluation may involve any type of analytic processing such as enterprise resource planning (ERP) analytics using at least one of the contextual data and the captured information. Further, at each decision point 130, the IMTP 112 may be configured to determine a data set among a plurality of alternative data sets to be used within the determined subsequent process step. As such, according to one embodiment, at each decision point 130, the IMTP 112 may evaluate a plurality of alternative process steps and data sets.

A subsequent process step from the plurality of alternative process steps may be determined based on the contextual data and captured information stored in an in-memory database, where the captured information includes the results of the at least one process step of the second business transaction (408). For example, the IMTP 112 may determine at least one of a subsequent process step and data set based on the contextual data and the captured information stored in the in-memory database 114. In particular, at some point in time, as explained above, the IMTP 112 may generate the second instance 138-2 related to the second business transaction. In one example, the generation of the second instance 138-2 may be prompted by the first business transaction of the first instance 138-2.

Similar to the first business transaction, the second business transaction may include one or more process steps. As such, the IMTP 112 may perform the one or more process steps associated with the second business transaction, and store the results of the process steps and/or transaction in the in-memory database 114. These stored results are made available for other parallel transactions including the first business transaction. As such, the IMTP 112 may read the captured information from the in-memory database 114, and determines at least one of a subsequent process step and data set based on the captured information and the contextual data.

In one example, referring to FIG. 2, at the first decision point 130-1, the IMTP 112 may determine a subsequent process step and data set (e.g., S2, S2' or S4) based on the received contextual data and captured information stored in the in-memory database 114. The captured information may relate to results of one or more process steps for a separate parallel transaction, which may have been prompted by the first transaction. For example, at decision point 130-1, the IMTP 112 may read data and process the context of existing and newly captured data to decide on a follow-up process step and data context.

In particular, at the first decision point 130-1, a first path indicated by process step S2 and process step S3 may represent a standard process of the IMTP based application 108, a second path indicated by process steps S2' and S3' may represent a standard process with an alternative data set, and a third path indicated by process step S4 may represent an alternative process of the IMTP based application 108. Therefore, at the first decision point 130-1, the IMTP 112 may evaluate alternative process steps, as well as alternative data sets, in order to decide on a follow-up process path. According to the embodiments, the IMTP 112 may evaluate each of the first, second and third path, and select one of the paths based on the received contextual data (e.g., from steps S0 and S1) and the captured information in the in-memory database 114.

Transactional results of the one or more process steps of the first business transaction may be stored in the in-memory database to be available for at least one other parallel transaction (410). For example, the IMTP 112 may store the results of the evaluation and determination in the in-memory database 114 to be available for one or more parallel transactions.

Figure 5A:
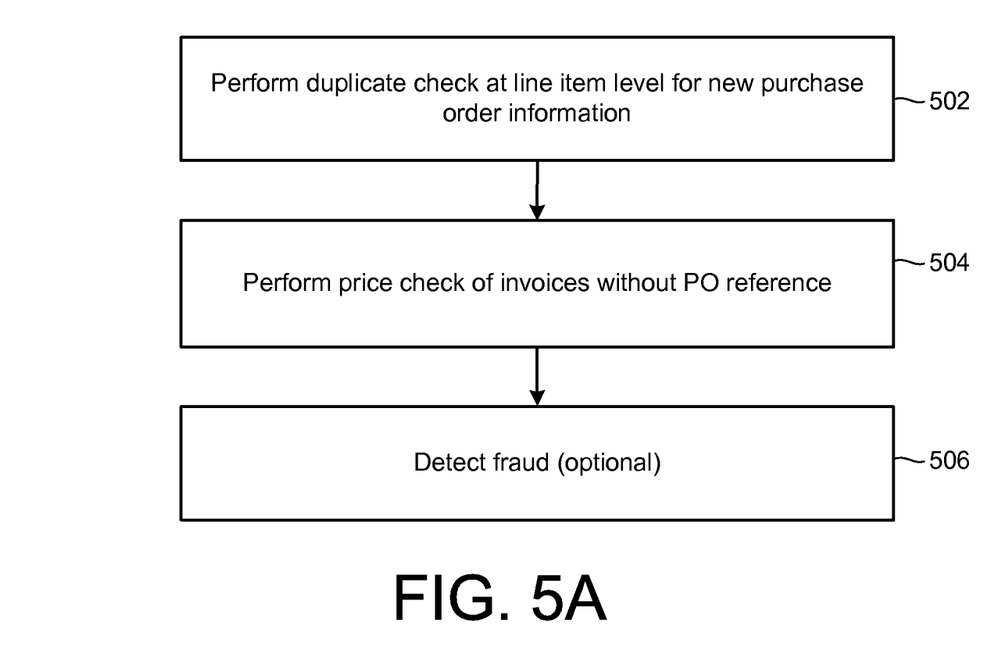
FIG. 5A is a flowchart illustrating functionalities associated with an in-memory-enabled transactional application relating to a purchase order application according to an embodiment.

FIG. 5A is a flowchart illustrating functionalities associated with an in-memory-enabled transactional application 108 relating to a purchase order application according to an embodiment. Although FIG. 5A is illustrated as a sequential, ordered listing of operations, it will be appreciated that some or all of the operations may occur in a different order, or in parallel, or iteratively, or may overlap in time.

Duplicate check may be performed at a line item level for new purchase order information (502). For example, the IMTP 112 may be configured to perform a duplicate check operation at a line item level for new purchase order information. In particular, the IMTP 112 may receive new purchase order information via an interface display from the user. A conventional purchase order application may perform a duplicate check based on the attributes of the supplier invoice header such as date, amount, and/or supplier, etc. For example, a conventional purchase order application may compare one or more pierces of information (e.g., date, amount, supplier) from the header of the supplier's invoices with the new purchase order information.

However, the IMTP based purchase order application extends the duplicate check towards the line item level to increase reliability of duplicate check for similar/regular supplier invoices. For instance, according to the embodiments, the supplier's invoices may be stored in the in-memory database 114. As such, in the context of receiving new purchase order information, the IMTP 112 may be configured read all (or substantially all) the invoices for a particular supplier, and compare this information with the new purchase order information on a line item level. Based on this comparison, the IMTP 112 may be configured to detect whether the new purchase order is a duplicate of a previous duplicate purchase order in a more reliable fashion. Based on this analysis, the IMTP 112 may evaluate a plurality of alternative process steps and data set, and select a subsequent process step and data set such as a price check, as explained below.

A price check may be performed without using the purchase order reference (504). For example, the IMTP 112 may read all (or substantially all) existing invoices from the in-memory database 114, and perform a price check by comparing the new purchase order information with the existing invoices without the purchase reference number. For example, the IMTP 112 may detect a typographically error when entering invoices for office supplies, for example.

Fraud may be optionally detected (506). For example, the IMTP 112 may be configured to optionally detect fraud. In particular, the IMTP 112 may employ fraud detection capabilities into the transaction context to prohibit damage.

Figure 5B:
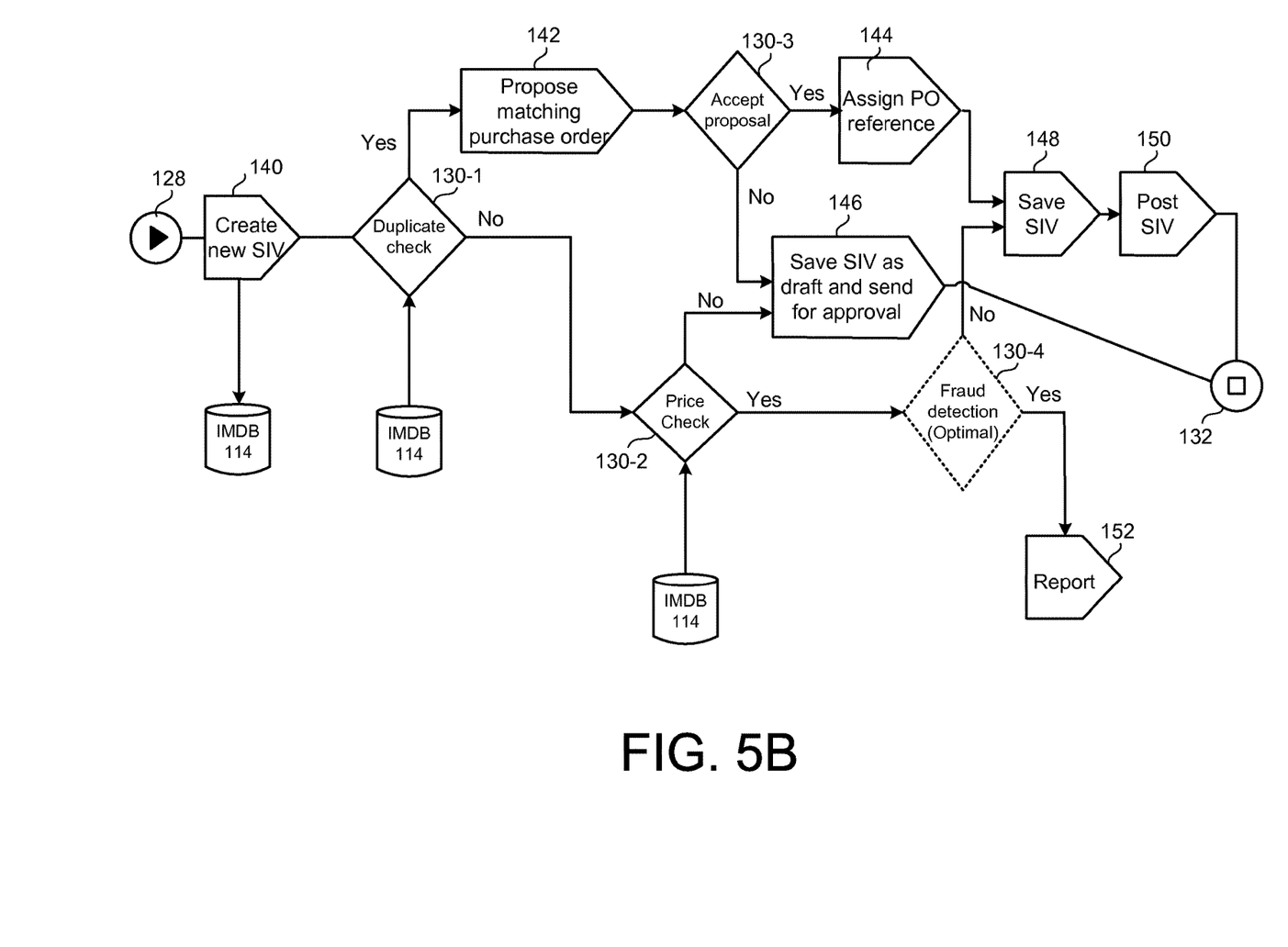
FIG. 5B illustrates a process of an in-memory enabled transactional purchase order application according to an embodiment.

FIG. 5B illustrates a process of the IMTP-enabled transactional purchase order application performed by the IMTP 112 according to an embodiment. For example, FIG. 5B depicts a more detailed view of the IMTP-enabled transactional purchase order application performed by the IMTP 112.

After the transaction starts (128), the IMTP 112 may create a new supplier invoice based on information received via an interface display, and store the supplier invoice without the purchase order reference in the in-memory database 114 (140). The stored supplier invoice without the purchase order reference may be considered the contextual data. Then, the IMTP 112, at a first decision point 130-1, may evaluate a plurality of alternative process steps (and possibly data sets) during runtime of the application and determine at least one of a subsequent process step and data set based on the contextual data and the captured information. The captured information may relate to results of one or more secondary transactions such as the creation and storage of open purchase orders by the supplier identified in the contextual data. For example, at the first decision point 130-1, the IMTP 112 may evaluate and determine the subsequent process step(s) by performing a duplicate check based on the open purchase orders by the identified supplier, which are captured in the in-memory database 114. For example, the IMTP 112 may determine if purchase order items are already stored in the in-memory database 114.

If the IMTP 112 determines that no duplicates exist, the IMTP 112 may determine the second decision point 130-2 as the subsequent process step. On the other hand, if the IMTP 112 determines that one or more duplicates exist, the IMTP 112 may determine process step 142 as the subsequent process step. In the event that IMTP 112 selects the process step 142, the IMTP 112 may modify the purchase order (142) in order to avoid a duplicate situation. At a third decision point 130-3, the IMTP 112 may determine whether the proposal is accepted. For example, an administrator or other user of the system 100 may review the modified, and indicate whether proposal is accepted. Based on acceptance information received via an interactive display, the IMTP 112 may determine that the modification is accepted. Then, the IMTP 112 may assign a purchase order number to the modified service invoice (144), save the invoice in the in-memory database 114 (148), and post the invoice (150), which effectively ends the transaction (132). On the other hand, if the modification is not accepted, the IMTP 112 may save the service invoice as a draft and send (or notify) the draft service invoice for approval (146), which effectively ends the transaction (132).

In the event that the IMTP 112 selects the second decision point 130-2 as the subsequent step, the IMTP 112 may evaluate a plurality of alternative process steps and data sets during runtime and select at least one of a subsequent process step and data set (e.g., step 146 or a fourth decision point 134-4) by performing a price check on the received purchase order information based on the captured information relating to previous service invoices. For example, the in-memory database 114 may store all (or substantially all) service invoices on a line item basis, which essentially stores the service invoices in a manner that their items may be searched such as products, supplier and/or quantity for example. In this case, the IMTP 112 may read the service invoice items and compare these items to the purchase order information in order to perform the price check. If the price of the purchase order information passes the price check, the IMTP 112 may determine the fourth decision point 130-4 as the subsequent step. If the price of the purchase order information does not pass the price check, the IMTP 112 may determine process 146 as the subsequent process step, which saves the service invoice as a draft and sends out for approval (146), which effectively ends the transaction (132).

In the event that the IMTP 112 selects the fourth decision point 130-4 as the subsequent process step, the IMTP 112 may perform a fraud detection process. For example, the IMTP 112 may employ fraud detection capabilities into the transaction context to prohibit damage. Depending on the outcome of the fraud detection, the IMTP 112 may save the service invoice (148) and then post the service invoice (150) or report the detection of fraud (152).

Figure 6:
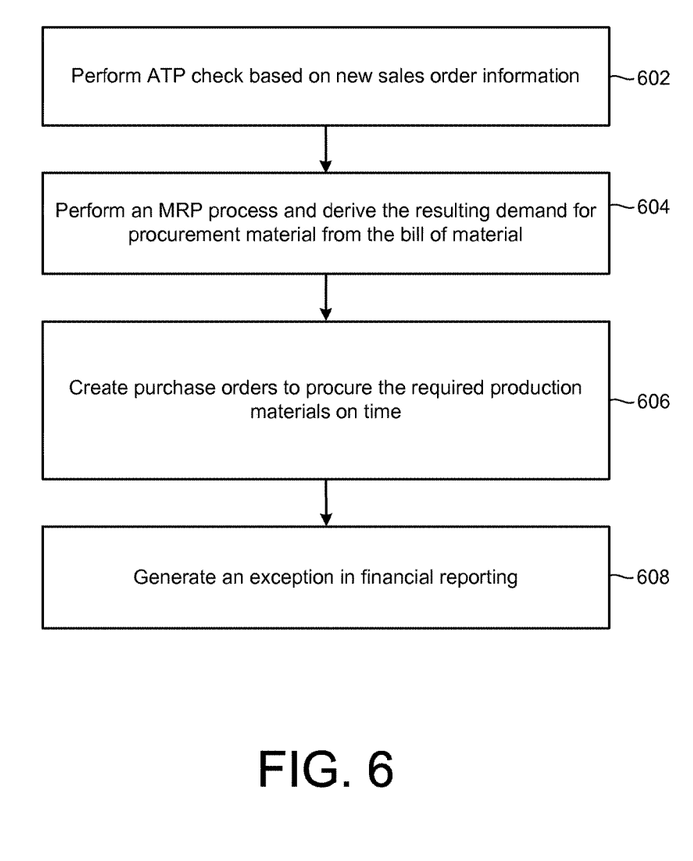
FIG. 6 is a flowchart illustrating functionalities associated with an in-memory-enabled transactional application relating to a sales order application according to an embodiment.

FIG. 6 is a flowchart illustrating functionalities associated with an in-memory-enabled transactional application 108 relating to a sales order application according to an embodiment. Although FIG. 6 is illustrated as a sequential, ordered listing of operations, it will be appreciated that some or all of the operations may occur in a different order, or in parallel, or iteratively, or may overlap in time.

An availability-to-promise (ATP) check may be performed based on new sales order information (602). For example, the IMTP 112 may be configured to perform the ATP based on the receipt of new sales order information. In particular, the IMTP 112 may receive new sales order information via an interface display from the user. The sales order information may include a customer identifier, the requested products, quantity, and/or price. Based on the performance of the APT check, the IMTP 112 may determine that only 5% of the requested product is on stock, while 95% of the requested product needs to be manufactured for this sales order. In other words, the IMTP 112 may determine an out-of-stock situation, and based on this analysis, the IMTP 112 may evaluate a plurality of alternative process steps and data sets, and select at least one of a subsequent process step and data set such as a materials requirement planning (MRP) process, as explained below.

An MRP process may be performed, and the resulting demand for procurement material may be derived from the bill of material (604). For example, the IMTP 112 may perform the MRP process, which is a production planning and inventory control process used to mange manufacturing processes. In the new sales order context, the IMTP 112 may determine the amount and type of materials needed to fulfill the sales orders by consulting the manufacturing information captured in the in-memory database 114. For example, the IMTP 112 may perform any type of MRP process known to one of ordinary skill in the art in order to determine the amount and type of materials needed to complete the sale orders. Thereafter, based on the results of the MRP process, the IMTP 112 may evaluate a plurality of alternative process steps and data sets, and select at least one of a subsequent process step and data set such as creating purchase orders to procure the required production materials, as explained below.

Purchase orders may be created to procure the required production materials (606). For example, the IMTP 112 may create the required number of purchase orders so that the materials can be procured in order to meet the sales order. Based on the number of purchase orders, the IMTP 112 may evaluate a plurality of alternative process steps and data sets, and select at least one of a subsequent process step and data set. In one example, if the number of purchase orders is relatively large, an exception in financial reporting may be generated (608). For example, the IMTP 112 may decide, based on the number of purchase orders, that the company may not have enough liquidity to meet the obligations of the purchase orders in the given time frame. In other words, the IMTP 112 may determine a risk of illiquidity over a threshold amount due to the time lag between cash disbursement to the suppliers and incoming payment from the customers. In this case, the IMTP 112 may recommend consulting with the finance department before sending out a confirmation to the customer.

As such, according to the embodiments, within the context of creating a new sales order, the IMTP 112 may perform steps 602, 604, 606 and 608 on the fly and recommend consulting with the finance department before sending out a confirmation to the customer. Therefore, the IMTP 112 may perform the MRP process, create the necessary purchases orders, and perform the liquidity check during runtime of the application in real-time or near real-time before a confirmation is communicated to the customer.

Figure 7:
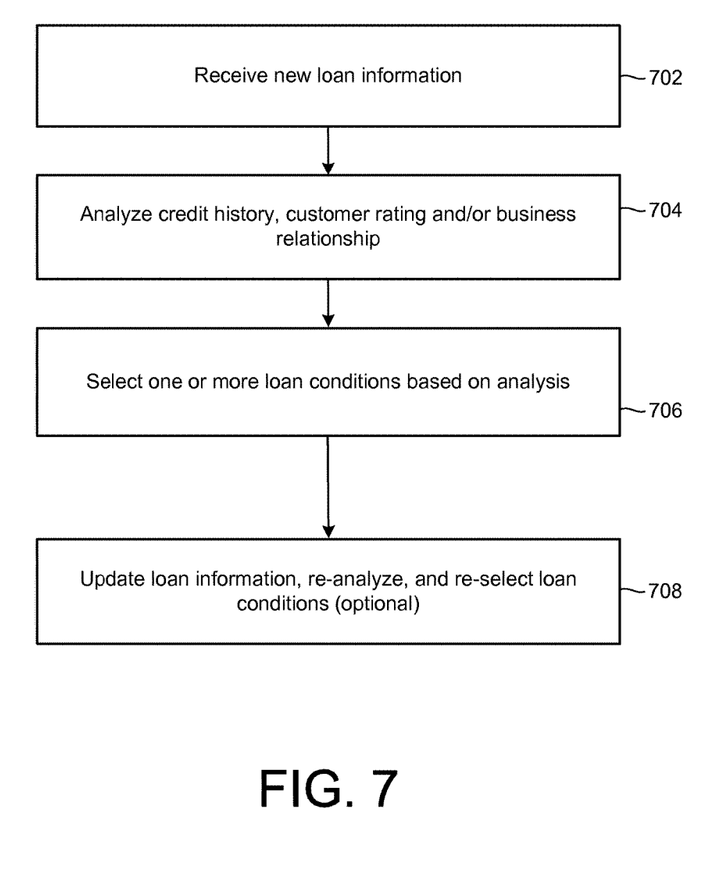
FIG. 7 is a flowchart illustrating functionalities associated with an in-memory-enabled transactional application relating to a loan application according to an embodiment.

FIG. 7 is a flowchart illustrating functionalities associated with an in-memory-enabled transactional application 108 relating to a loan application according to an embodiment. Although FIG. 7 is illustrated as a sequential, ordered listing of operations, it will be appreciated that some or all of the operations may occur in a different order, or in parallel, or iteratively, or may overlap in time.

New loan information may be received (702). For example, a customer may call a bank in order to obtain a bank loan, and during the conversion with the bank representation, the bank representation may enter the relevant data into the system. As such, the IMTP 112 may receive the entered new loan information and store this information in the in-memory database 114.

Credit history, customer rating and/or business relationship may be analyzed (704). For example, the IMTP 112 may analyze the credit history, customer rating, and/or business relationship, etc. Based on this analysis, loan conditions with a range of interest rates may be proposed and the bank representative may start the negotiation with the customer. In other words, upon instantiation of a loan inquiry transaction, the IMTP 112 may prompt a secondary transaction related to the collection of the credit history, customer rating, and/or business relationship, and store this analytical information in the in-memory database 114. Then, the IMTP 112 may evaluate alternative process steps and determine a subsequent process based on the captured information stored in the in-memory database, e.g., deciding on a follow up process path based on the existing and newly captured information, which may be the proposal of one or more loan conditions, as explained below.

One or more loan conditions may be selected (706). For example, based on the evaluation and determination, the IMTP 112 may select loan conditions such as the applicable interest rate and amount, among others, for example. Loan information may be updated, the loan may be re-analyzed, and loan conditions may be re-selected (708). For example, upon being presented with the loan conditions, the customer may want to adjust the loan by selecting a different amount, for example. In this case, steps 702, 704, and 706 may be performed on the fly in real-time or near real-time, and the new loan conditions may be presented to the customer for further evaluation.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for linking an application with an in-memory database system for enabling an in-memory-enabled transactional application to perform a plurality of business transactions in conjunction with the in-memory database system, the system comprising:

an in-memory transactional processor configured to execute an application in conjunction with an in-memory database system, the in-memory transactional processor configured to receive contextual data related to an instantiation of a first business transaction of the application and instantiate at least one second business transaction of the application during a course of processing the first business transaction, each of the first business transaction and the at least one second business transaction including a sequence of process steps, the first business transaction and the at least one second business transaction being parallel transactions for at least a period of time, the in-memory transactional processor configured to store results of at least one process step of the at least one second business transaction in the in-memory database system, the in-memory transactional processor configured to evaluate, at a decision point within the sequence of process steps of the first business transaction, a next process step as specified by a business model of the application and a plurality of alternative process steps that are alternatives to the next process step to determine a subsequent process step to be performed after the decision point using the contextual data and the results of the at least one process step of the at least one second business transaction that have been stored as newly captured information in the in-memory database system, and the in-memory transactional processor configured to store transactional results of the first business transaction in the in-memory database system to be available for at least one other parallel transaction.

2. The system of claim 1, wherein the in-memory transactional processor is configured to not lock the in-memory database system when the first business transaction and the at least one second business transaction requires access to a same portion of the in-memory database system such that the first business transaction and the at least one second business transaction can access and persist data into the in-memory database system at a same time.

3. The system of claim 1, wherein the in-memory transactional processor is configured to evaluate, at multiple different decision points within the sequence of process steps of the first business transaction, a next process step as specified by the business model of the application and a plurality of alternative process steps that are alternatives to the next process step and select one of the plurality of alternative process steps as the subsequent process step at each decision point based on newly captured information in the in-memory database system relating to other parallel transactions and results of any analytic processing that have been persisted to the in-memory database system such that the application can change its process flow in real-time to adapt to the newly captured information.

4. The system of claim 1, wherein, if the first business transaction stops before completion, the in-memory transactional processor is configured to return the first business transaction to a process step located in a middle of the sequence of process steps of the first business transaction.

5. The system of claim 1, wherein the in-memory transactional processor configured to receive contextual data related to an instantiation of a first business transaction of the application includes receiving the contextual data via a user interface, writing the contextual data in the in-memory database system, and then reading the contextual data from the in-memory database system.

6. The system of claim 1, wherein the in-memory transaction processor is configured to evaluate, at the decision point, which process step to be subsequently executed and which data set to use within the process step to be subsequently executed based on the newly captured information in the in-memory database system including selecting one of a standard business process step with a standard data set as specified by the business model of the application, the standard business process step with an alternative data set that is an alternative to the standard data set, and an alternative business process step that is an alternative to the standard business process step.

7. The system of claim 1, wherein the in-memory transactional processor is further configured to evaluate and determine, at the decision point, which data set among a plurality of data sets to use within the determined subsequent process step based on the results of the at least one process step of the at least one second business transaction and results of any analytic processing that have been persisted to the in-memory database system such that the application can adapt in real-time to the newly captured information, each data set of the plurality of data sets including a different set of business data.

8. The system of claim 1, wherein the application relates to a sales order application or a purchase order application.

9. The system of claim 1, wherein the in-memory transactional processor is configured to evaluate, at a secondary decision point that occurs after the decision point but within the sequence of process steps of the first business transaction, which process step to execute after the secondary decision point and which data set to use within the process step after the secondary decision point based on newly captured information in the in-memory database relating to other parallel transactions and results of analytic processing relating to performance metrics of the application that have been persisted to the in-memory database system.

10. The system of claim 1, wherein the captured information includes at least one of social network information, and sensor data.

11. The system of claim 1, wherein the in-memory transactional processor is configured to perform, at the decision point, enterprise resource planning (ERP) analytics, and select one of the plurality of alternative process steps as the subsequent step to be executed after the decision point based on results of the ERP analytics.

12. A method for linking an application with an in-memory database system for enabling an in-memory-enabled transactional application to perform a plurality of business transactions in conjunction with the in-memory database system, the method being performed by at least one processor, the method comprising:

executing an application in conjunction with an in-memory database system;

receiving contextual data related to an instantiation of a first business transaction of the application;

instantiating at least one second business transaction of the application during a course of processing the first business transaction, each of the first business transaction and the at least one second business transaction including a sequence of process steps, the first business transaction and the at least one second business transaction being parallel transactions for at least a period of time;

storing results of at least one process step of the at least one second business transaction in the in-memory database system during the course of processing the first business transaction but before the at least one second business transaction is completed;

evaluating, at a decision point within the sequence of process steps of the first business transaction, a next process step as specified by a business model of the application and a plurality of alternative process steps that are alternatives to the next process step to determine a subsequent process step to be performed after the decision point using the contextual data, the results of the at least one process step of the at least one second business transaction before the at least one second business transaction is completed, and results of any analytic processing, that have been stored as newly captured information in the in-memory database system during the course of processing the first business transaction; and storing transactional results of the first business transaction in the in-memory database system to be available for at least one other parallel transaction.

13. The method of claim 12, further comprising when the first business transaction and the at least one second business transaction require access to a same portion of the in-memory database system, reading or persisting data to the same portion of the in-memory database system during the course of processing the first business transaction and the at least one second business transaction without locking the in-memory database system.

14. The method of claim 12, further comprising:
evaluating, at multiple different decision points within the sequence of process steps of the first business transaction, a next process step as specified by the business model of the application and a plurality of alternative process steps that are alternatives to the next process step; and
selecting one of the plurality of alternative process steps as the subsequent process step at each decision point based on newly captured information in the in-memory database system relating to other parallel transactions and the results of any analytic processing that have been persisted to the in-memory database system during the course of processing the first business transaction such that the application can change its process flow in real-time to adapt to the newly captured information.

15. The method of claim 12, further comprising:
if the first business transaction stops before completion, returning the first business transaction to a process step located in a middle of the sequence of process steps of the first business transaction.

16. The method of claim 12, wherein the evaluating and the determining include evaluating, at the decision point, which process step to be subsequently executed and which data set to use within the process step to be subsequently executed based on the newly captured information in the in-memory database system including selecting one of a standard business process step with a standard data set as specified by the business model of the application, the standard business process step with an alternative data set that is an alternative to the standard data set, and an alternative business process step that is an alternative to the standard business process step.

17. The method of claim 12, further comprising:
evaluating and selecting, at the decision point, which data set among a plurality of data sets to use within the determined subsequent process step based on the results of the at least one process step of the at least one second business transaction and the results of any analytic processing that have been persisted to the in-memory database system during the course of processing the first business transaction such that the application can adapt in real-time to the newly captured information, each data set of the plurality of data sets including a different set of business data.

18. A computer program product tangibly embodied on a non-transitory computer-readable storage medium and including executable code that, when executed, is configured to cause one or more processors to:

execute an application in conjunction with an in-memory database system, the in-memory database system configured to perform analytic processing and store results of the analytic processing for use within a transactional context of the application;

receive contextual data related to an instantiation of a first business transaction of the application;

instantiate at least one second business transaction of the application during a course of processing the first business transaction, each of the first business transaction and the at least one second business transaction including a sequence of process steps, the first business transaction and the at least one second business transaction being parallel transactions for at least a period of time;

store results of at least one process step of the at least one second business transaction in the in-memory database system before the at least one second business transaction is completed but during the course of processing the first business transaction;

evaluate, at a decision point within the sequence of process steps of the first business transaction, which process step to be subsequently executed among a plurality of alternative process steps that are alternatives to a standard process step indicated by a business model of the application to determine a next process step of the first business transaction;

evaluate and determine which data set to use within the next process step among a plurality of alternative data sets that are alternatives to a standard data set, wherein the evaluation of which process step to be subsequently executed and the evaluation of which data set to use within the next process step are both based on the contextual data, the results of the at least one process step of the at least one second business transaction before the at least one second business transaction is completed, and the results of any analytic processing, that have been stored as newly captured information in the in-memory database system;

execute the determined next process step with the determined data set within the sequence of process steps of the first business transaction; and store transactional results of the first business transaction in the in-memory database system to be available for at least one other parallel transaction.

19. The computer program product of claim 18, wherein when the first business transaction and the at least one second business transaction require access to a same portion of the in-memory database system, the executable code that, when executed, is configured to cause the one or more processors to read or persist data to the same portion of the in-memory database system during the course of processing the first business transaction and the at least one second business transaction such that the in-memory database system is not locked.

20. The computer program product of claim 18, wherein the executable code that, when executed, is configured to cause the one or more processors to select, at the decision point, one of a standard business process step with a standard data set as specified by the business model of the application, the standard business process step with an alternative data set that is an alternative to the standard data set, and an alternative business process step that is an alternative to the standard business process step.

* * * * *